United States Patent [19]

Evans et al.

[11] 3,822,406

[45] July 2, 1974

[54] TELEMETERING REMOTE RECORDING UNIT

[75] Inventors: Ross Hugh Evans, Queens, N.Y.; Daniel Arron Seltzer, Cincinnati, Ohio; Robert Leonard Young, Florence, Ky.

[73] Assignee: Gamon-Calmet Industries Inc., Florence, Ky.

[22] Filed: May 23, 1973

[21] Appl. No.: 363,026

Related U.S. Application Data

[62] Division of Ser. No. 220,011, Feb. 24, 1972, which is a division of Ser. No. 103,067, Dec. 31, 1970.

[52] U.S. Cl. ............................... 328/37, 307/221 R

[51] Int. Cl. ........................................ G11c 19/00

[58] Field of Search ........................ 307/221; 328/37

[56] References Cited

UNITED STATES PATENTS

| | | | |
|---|---|---|---|
| 2,951,230 | 8/1960 | Cadden | 307/221 R |
| 3,103,580 | 9/1963 | Foreman | 328/37 X |
| 3,258,696 | 6/1966 | Heymann | 307/221 R |

*Primary Examiner*—John Zazworsky

[57] ABSTRACT

A system is disclosed for reading utility meters over a switched telephone network. In the system, information, including a telephone number is stored on a first punch card and reproduced by a card duplicator on a second initially blank punch card. The information representing the telephone number in addition to being reproduced on the second card, is also entered into a storage register. The number in the storage register is called up by an automatic calling unit and pulsed out onto a switched telephone network. The switched telephone network activates a meter reading circuit at an appropriate location represented by the telephone number. The meter reading circuit generates signals indicative of the meter reading and sends them back over the switched telephone network to be stored in the same storage register where the telephone number was entered. When the complete meter reading signal is in the storage register, the card duplicator is again activated to now receive information from the storage register. This information is then punched onto a still blank area on the second punch card. Details of the storage register and the circuitry at the meter are also disclosed.

4 Claims, 2 Drawing Figures

TELEMETERING REMOTE RECORDING UNIT

This is a divisional of out co-pending patent application, Ser. No. 220,011, filed Jan. 24, 1972, now U.S. Pat. No. 3,764,918.

The above co-pending patent application was a divisional of out co-pending patent application, Ser. No. 103,067 filed Dec. 31, 1970, now U.S. Pat. No. 3,700,816.

FIELD OF THE INVENTION

This invention relates to remote reading of utility meters and particularly to remote reading of utility meters over a switched telephone network.

BACKGROUND OF THE INVENTION

Most buildings in the United States are provided utilities on a metered basis. In each of such buildings water, for example, is supplied by a utility company. The water passes through a water meter into each building or portion thereof so that information for billing each customer may be obtained. Presently, a meter reader periodically visits each location where a meter is located to read the meter.

Most facilities which are equipped with water meters are also equipped with telephone service. The telephones in most geographic areas are interconnected through one or more switching offices.

For at least 60 years men have thought of reading utility meters over the telephone company's wire network to eliminate the need for sending people to physically look at and read the meters. This has always been desirable because it would eliminate the need for these meter readers who not only represent a large expenditure for utility companies but also encounter difficulty occasionally in gaining access to the area where the meter is located.

The prime reason why meters are not commonly read automatically over an available telephone network is economic. In most instances, it is still less expensive to send people to read the meters than install and operate automatic meter reading equipment.

Many automatic meter reading systems presently contemplated envision the use of a high speed computer to gain access to meters. The same coumputer would receive and evaluate the information sent back. The philosophy behind these systems takes into account the fact that equipment located in the meter is reproduced thousands of times for each central accessing terminal so that substantially more expensive equipment can be employed at the central point.

It has been found, however, that the utility companies most likely to require automatic meter reading in the near future are the smaller ones who cannot afford the large capital outlays associated with general purpose computers or large special purpose computers.

The use of a high speed computer as the central accessing terminal presents an additional problem because information received at high speeds must be stored on tape, discs or other high speed storage devices which are serial in nature. To then process information thus received, a sorting step is normally employed searching through all the received data for various catagories or responses. For example, a search would first be initiated for busy signals, for no answers, etc. This search increases the cost of the system to the user because expensive equipment (i.e. a computer) is needed to sort such serially stored data.

Therefore, it is an object of this invention to provide a system for reading utility meters over a swtiched telephone network.

It is another object of this invention to provide a system for reading meters which allows sorting of received information by inexpensive equipment.

It is still another object of this invention to provide a meter reading system which not only employs inexpensive terminal equipment at each meter location but also economically calls up these locations in sequence and receives information transmitted thereby.

It is a further object of this invention to provide a shift register which enables the design of an economically feasible meter reading system.

BRIEF DESCRIPTION OF THE INVENTION

With these and other objects in view the present invention contemplates an encoder for use in a remote telemetering system which ncludes an "N" state shift register for storing and shifting data bits in the form of "1's" and "0's", N being an integer of three or more, wherein the shift register is responsive to a clock signal for receiving applied data bits into a first of the N stages and advancing the data bits stored in each of the N stages to a next succeeding stage; the shift register is further responsive to a transfer signal for receiving data bits in parallel into two or more of the N stages and inserts a predetermined data bit into a predetermined 1 of the N stages, the bits received in response to the transfer signal override the bits advanced by the clock signal. Apparatus is supplied for normally applying a signal level indicative of a data bit different from the predetermined data bit to the first stage of the shift register. This apparatus is responsive to the transfer signal for applying a signal level indicative of the predetermined data bit to the first stage of the shift register. Apparatus is also provided which is responsive to the simultaneous occurrence of a data bit different than the predetermined data bit being present at the predetermined 1 of the N stages and to particular other of said N stages for providing the transfer signal.

DETAILED DESCRIPTION OF THE INVENTION

Figure 1:
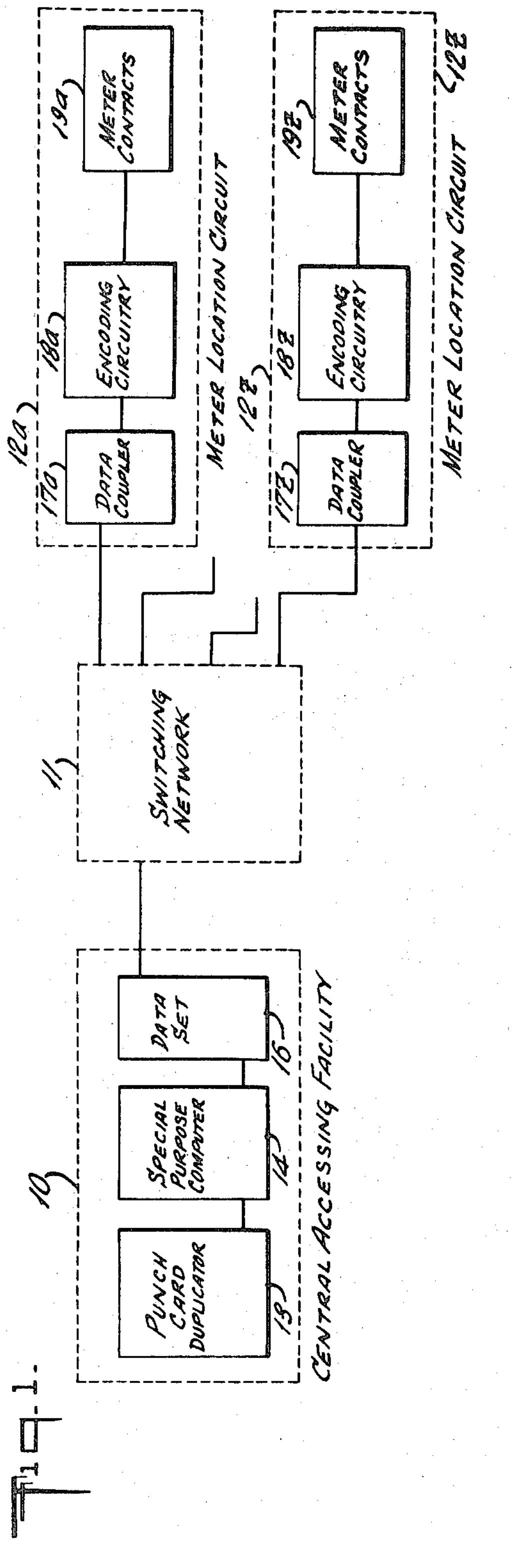
FIG. 1 is a block diagram showing the basic system contemplated by this invention.

Referring now to FIG. 1, we see a block diagram of a system for reading utility meters over a switched telephone network which is laid out in accordance with the teachings of this invention. The system basically is segmented into three portions, a central accessing facility 10, a switching network 11 and a plurality of meter location circuits 12*a* through 12*z*. It should be appreciated that leads interconnecting various boxes in the block diagrams may actually represent cables having a plurality of leads.

At the central accessing facility 10, a punch card duplicator 13 is connected by a special purpose computer 14 to a data set 16. The punch card duplicator 13 is a commercially available unit which individually reads a standard punched card and duplicates the card by punching the information thereon onto a blank punch card in accordance with a program normally applied to the machine in the form of a program punched card.

In accordance with this invention, portions of the information on the first punch card (i.e. a telephone number) is applied to the special purpose computer 14 which applies the telephone number through the data set 16 to the switching network 11. The switching network 11 selects the particular meter location circuit 12*a* through 12*z* represented by the applied telephone number.

The particular meter location circuit 12*a* through 12*z* selected by the switching network 11 is energized by a signal sent thereto from the switching network 11. The signal passes through a data coupler 17*a* through 17*z* to energize the associated encoding circuitry 18*a* through 18*z*.

The encoding circuitry 18*a* through 18*z* senses the condition of meter contacts 19*a* through 19*z* and transmits a code indicative of their condition back through the data coupler 17*a* through 17*z*, the switching network 11, data set 16 through the special purpose computer 14 which decodes the information and energizes the punch card duplicator 13 to record appropriate information on the duplicated punch card.

Figure 2:
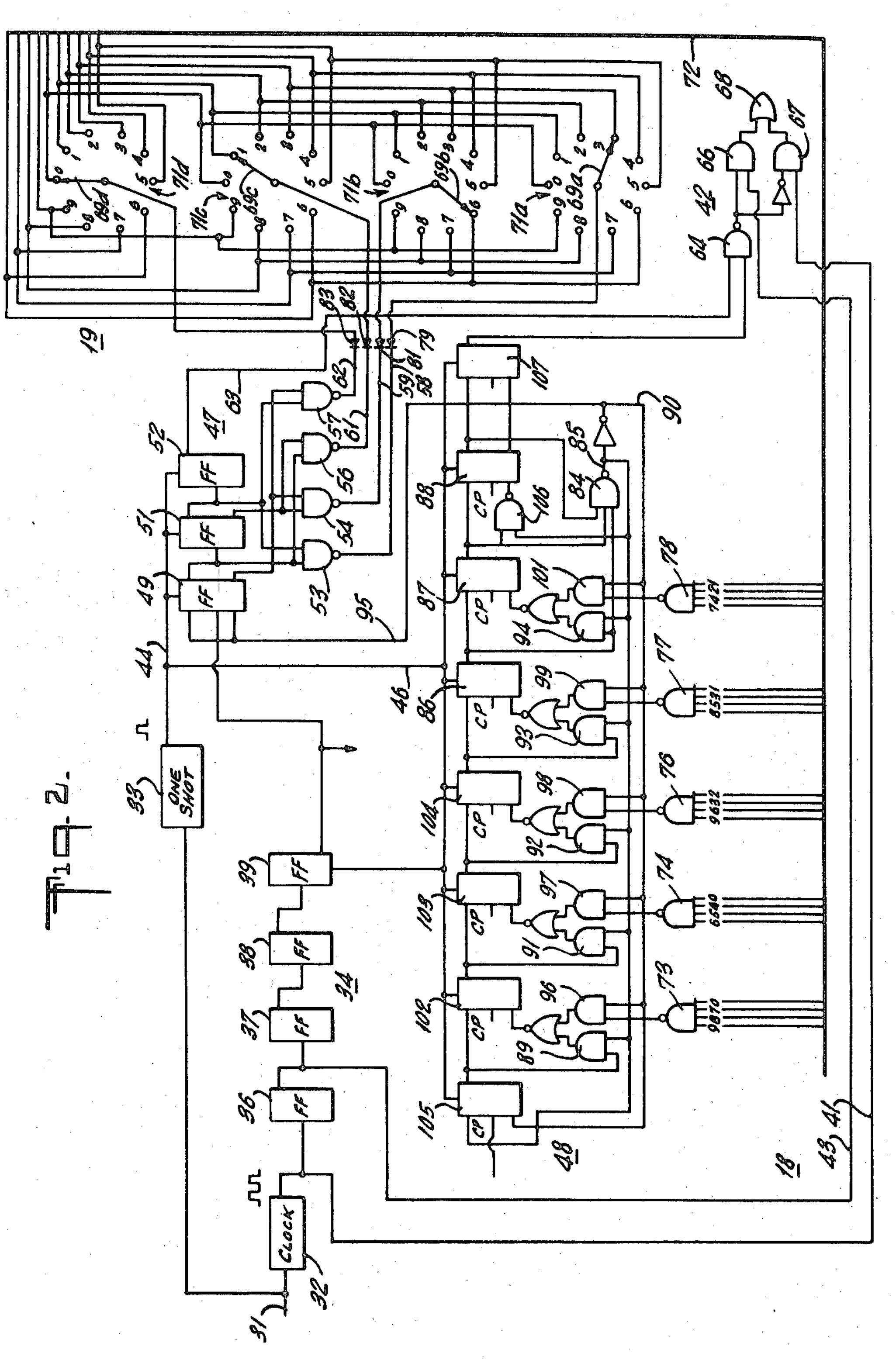
FIG. 2 is a block diagram of a meter reading circuit connected to a utility meter register which is employed in the system of this invention.

FIG. 2 shows in detail the encoding circuitry 18 and the meter contacts 19. When a data coupler 17 is selected by the switching network 11, a signal is applied on a lead 31 which initiates operation of a clock 32 and a one shot 33. The signal from the clock 32 is applied to a counting chain 34 which includes four flip-flops 36 through 39. In this embodiment, the clock 32 provides a signal of 2,240 hertz. Therefore, the output from the flip-flop 36 is a signal at a 1,120 hertz. The output from the flip-flop 39 designated $C_p$ is a signal of 140 hertz. It should be clear that the number of flip-flops 36 through 39 and the frequency of the clock 32 are selected to provide signal frequencies necessary for operation of the remaining circuitry. If other frequencies were selected, one would merely change either or both the frequency of the clock 32 and the number of flip-flops in the counting chain 34.

The 2,240 hertz signal and the 1,120 signal are employed as representations of 1's and 0's in a frequency shift keying system for transmission back to the central accessing faciltiy 10 over the switching network 11. To this end the output from the clock 32 is applied by a lead 41 to a modulating logic circuit 42 while the output from the flip-flop 36 is applied by a lead 43 to the modulating logic circuit 42. The output from the counting chain 34 which is taken from the flip-flop 39 and designated $C_p$ is used for clocking shift registers and other counting chains in the encoding circuitry 18. It should be clear that the timing generating circuitry including clock 32 and counting chain 34 and the modulating circuitry including the modulating logic 42 could be provided by the telephone company as part of the data coupler 17 or a special data set.

The output from the one shot circuit 33 is applied by leads 44 and 46 to reset by-stable circuits included in a scanning counter 47 and a meter signal shift register 48. The shift register 48 is configured so that each stage is reset to a 1 condition rather than the normal 0 condition. The scanning counter 47 includes three flip-flops 49, 51, and 52 which act as a counting chain to count down cycles of operation of the shift register 48. The output from the flip-flops 49 and 51 are decoded by four NAND gates 53, 54, 56 and 57 to sequentially energize leads 58, 59, 61 and 62.

The output from the third flip-flop 52 is employed to provide a gating signal to prevent transmission of information until a specified waiting interval has occurred to allow the switching network 11 to settle down. To this end the output of the flip-flop 52 is applied by a lead 63 through a NAND gate 64, which forms a part of the modulating logic circuitry 42. During the first four counts of the scanning counter 47, an inhibit signal is applied by a lead 63 to the NAND gate 64. The NAND gate 64 thereby holds the NAND gates 66 and 67 in predetermined states so that only one of the signals on the leads 41 or 43 are passed through OR gate 68 and thereby back to the data coupler 17. It should be clear that the timing functions performed by the flip-flops 49, 51, and 52 could also be formed by shift register circuitry. If this were the case, eight shift registers and a four-input OR gate could be employed. The first four shift register stages would be connected to the OR gate to provide the gating signal on the lead 63. Each of the remaining shift register stages would be connected to one of the leads 58, 59, 61 or 62.

Each of the leads 58, 59, 61 and 62 are connected to the wiper arm 69*a* through 69*d* of one decimal contact transducers 71*a* through 71*d*. Each of the decimal contact transducers 71*a* through 71*d* has 10 contact positions to which the wiper arm 69*a* through 69*d* may be connected, It should be clear that these decimal contact transducers may be constructed from coded printed circuit wheels.

The decimal contact transducers each are associated with one dial of a utility meter to be read. Corresponding contacts of each of the transducers 71*a* through 71*d* are connected in parallel. The parallel contacts are carried by the cable 72 to drive NAND gates 73, 74, and 76 through 78 which form an encoding network to transform signals supplied by the cable 72 which are in the form of a "1 out of 10" signal into a "2 out of 5" coded signal. This transformation is well known.

The 2 out of 5 signal is arranged so that three 1's never occur in a row. In operation, each of the wiper arms 69*a* through 69*d* are energized individually by the signals on the leads 58, 59, 61 through diodes 79 and 81 through 83. When each wiper arm 69*a* through 69*d* is energized, the NAND gates 73 through 74 and 76 through 78 provide the 2 out of 5 code to the shift register 48 which then accepts the coded information therein, adds in error checking and framing bits and shifts the signal to be applied to the NAND gate 64 at the rate determined by the $C_p$ signal to energize the modulating logic circuit 42 for transmission of the frequency shift keyed signal back over the switching network 11 to the central accessing facility 10.

The shift register 48 is synchronized with the remaining circuitry by use of the properties of the 2 out of 5 code employed. A three input NAND gate 84 senses the output condition of three of the shift register stages 86 through 88 in the shift register 48 to detect three consecutive 1's. The receipt by the NAND gate 84 of these three consecutive 1's energized it to provide a transfer signal on a lead 85 and the complement thereof on a lead 90. Since the one shot 33 initially sets each stage of the shift register 48 to contain 1's a transfer signal will be initially present upon reset to load information from the first dial into the shift register 48 and advance the scanning counter 47 one count.

To this end, the complement of the transfer signal on the lead 90 is applied by a lead 95 to advance the scanning counter 47 one count upon the next occurrence of the $C_p$ signal. At the same time, the signal on the lead 85 is employed to inhibit a plurality of AND gates 89 and 91 through 94 which in normal operation interconnect the stages in the shift register 48 for normal shift register operation. The signal on the lead 90 is at the same time employed to drive AND gates 96 through 99 and 101 for transferring the information presented by the NAND gates 73, 74, and 76 through 78 to five stages 102, 103, 104, 86 and 87 of the shift register 48. These five stages, therefore, now contain the 2 out of 5 coded information indicative of the reading of the particular dial being sampled by the scanning shift register 47.

The reason that the AND gates 96 through 99 and 101 were able to transfer the meter reading information into the stage 102 through 104, 86 and 87 is that the shift register stages 105, 102 through 104 and 86 had 1's stored therein at the time of transfer and each of the shift register stages is a JK flip-flop which will toggle when both of its inputs are high, remain the same when both inputs are low and transfer the information on its upper input to the upper output when the two inputs differ in response to a clock pulse. Since a 1 is applied to the upper input of each of the shift register stages 102 through 104 and 86 and 87 by the previous stage 105, 102 through 104 and 86 respectively, a zero applied to the lower input thereof will transfer the 1 on the J input to the output, essentially leaving the stage unchanged. Since the information from each of the gates 73, 74, 76 through 78 are passed through an AND gate and then a NOR gate which inverts the signal, a zero on the lower input will represent a 1 which is the signal which will be applied to the particular stage in question.

On the other hand, if a 1 is applied to the lower input of any of the shift register stages 102 through 104 and 86 and 87, on the next $C_p$ pulse, that stage will toggle providing a zero at the output thereof. As is well understood, each of the flip-flop stages have sufficient built-in delay to continue providing the 1 to the successive stage for a sufficient period of time to enable proper information transfer.

During the transfer interval, the signal on the lead 85 is also applied as the upper input to the first stage 105 of the shift register 48 while the complement thereof on lead 87 is applied as the lower input which drives the stage 105 to have a zero at its upper output. In a like manner, a 1 is applied by the shift register stage 87 to the upper input of the shift register stage 88 while the gate 106 inverts the low now being provided by the three-input NAND gate 84 to apply a 1 to the higher input thereof so that the stage 88 complements in response to the next $C_p$ pulse thereby providing a 1 at the upper output thereof. The last stage of the shift register 48, 107, is made to assume the 1 stage because a 1 is present at its upper input while a zero is present at its lower input when the $C_p$ pulse arrives. Therefore, it is seen that immediately after transfer the first stage 105 of the shift register 48 contains a zero, the next five stages 102 through 104 and 86 and 87 contain the 2 out of 5 coded information, the stage 88 contains a 0 and stage 107 contains a 1.

The zero in the shift register stage 88 returns the three-input NAND gate 84 to a high state and the signal on the lead 90 returns to a low state thus inhibiting the scanning counter 47 from advancing further and insuring that a 1 rather than a 1 is now inserted in the first stage 105 each time the $C_p$ pulse is applied thereto.

Since the 2 out of 5 code insures that no more than two 1's will occur in succession, the gate 84 will not again assume a low condition while the information contained in the stages 102 through 104 and 86 and 87 are being shifted down the shift register 48. Again since the first stage 105 was driven to the zero condition during the transfer interval, this zero will pass through to the stage 107 before the three stages 86 through 88 will have all 1's therein. At this time, transfer will again occur as above discussed. This time, however, the information transferred will be from the next dial as selected by the scanning counter 47 which has advanced one count. It should be noted that each of the stages of the shift register 47 except the last one, 107, again contain all 1's. The data stored in the shift register 47 is transmitted as it is shifted into the stage 107. The stage 107 is employed to modulate the modulating logic circuitry 42 to provide either a signal of 2,240 hertz or 1,120 hertz in accordance with the information shifted thereto from preceding shift register stages. The output of the modulating logic circuit 42 is applied to the data coupler 17 and is passed through the switching network 11 back to the central receiving facility. It should be noted that since a zero was initially in the first stage 105 of the shift register 48, the information coming from the modulating logic circuit 42 will be 0, which was transferred up from the first stage 105 and is in the stage 107 upon transfer, 1 is then injected into the last stage 107 upon transfer and then 0 which is in the stage 88. These three bits serve as framing and error checking bits. The next five bits transferred are the information bits which may then be processed at the receiving location to extract meter readings therefrom. Each complete meter reading sent from a meter location 12 is a series of four 8-bit words. Each of the our 8-bit words contains information relative to the position of one dial of the meter being read. The first 3 bits of each 8-bit word are 0–1–0; the next five bits are the information containing bits.

It should be understood that the embodiments are merely illustrative of the principles of this invention and that numerous others will become obvious to those with ordinary skills in the art in light thereof.

What is claimed is:

1. In combination:

an "n" stage shift register for storing and shifting data bits in the forms of "1's" and "0's", N being an integer of three or more, said shift register being responsive to a clock signal for receiving applied data bits into a first of said N stages and advancing data bits stored in each of said N stages to a next succeeding stage; said shift register being further responsive to a transfer signal for receiving data bits in parallel into two or more of said N stages and inserting a predetermined data bit into a predetermined one of said N stages, said bits received in response to said transfer signal overriding said bits advanced by said clock signal;

a clock for providing said clock signal;

means for normally applying a signal level indicative of a data bit different from said predetermined data bit to said first stage of said shift register responsive to said transfer signal for applying a signal level indicative of said predetermined data bit to said first stage of said shift register; and means responsive to the simultaneous occurrence of a data bit different than said predetermined data bit being present at said predetermined one of said N stages and two particular other of said N stages for providing said transfer signal.

2. The combination as defined in claim 1 also including means for providing said data bits in parallel, said data bits in parallel providing means including:

first and second multiposition switches, each of said switches having a wiper arm and a plurality of contacts;

means for connecting each of said plurality of contacts on said first multiposition switch to one of said plurality of contacts on said second multiposition switch; and means for connecting said contacts to said N stage shift resistor.

3. The combination as defined in claim 2 also including:

means responsive to a start signal for sequentially applying a voltage signal to said wiper arms of said first and second multiposition switches.

4. The combination as defined in claim 3 also including:

means for generating a first transmittable signal;

means for generating a second transmittable signal; and means responsive to information stored in one of said stages of said N stage shift register for providing one of said first and second transmittable signals.

* * * * *

UNITED STATES PATENT OFFICE
CERTIFICATE OF CORRECTION

Patent No. 3,822,406 Dated July 2, 1974

Inventor(s) Ross Hugh Evans et al

It is certified that error appears in the above-identified patent and that said Letters Patent are hereby corrected as shown below:

Under Column "1", line 46,
"coumputer" should be "computer"

Under Column "2", line 21
"ncludes" should be "includes"

Under Col. 4, line 44
the sentence "signals on the leads 58, 59, 61......"
should be "signals on the leads 58, 59, 61 and 62......"

Under Col. 6, line 3
the sentence "that a 1 rather than a 1 is....."
should be "that a 1 rather than a "0"......."

Under Col. 6, line 39
the sentence "Each of the our 8-bit....."
should be "Each of the four 8-bit....."

Signed and sealed this 3rd day of December 1974.

(SEAL)
Attest:

McCOY M. GIBSON JR.
Attesting Officer

C. MARSHALL DANN
Commissioner of Patents